(12) United States Patent
He

(10) Patent No.: US 8,698,654 B2
(45) Date of Patent: Apr. 15, 2014

(54) SYSTEM AND METHOD FOR SELECTING IMAGES TO BE DISPLAYED

(75) Inventor: Gang He, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 70 days.

(21) Appl. No.: 13/339,028

(22) Filed: Dec. 28, 2011

(65) Prior Publication Data
US 2013/0169450 A1  Jul. 4, 2013

(51) Int. Cl.
*G01C 21/00* (2006.01)

(52) U.S. Cl.
USPC ........... 340/971; 340/972; 340/980; 340/979; 701/16; 701/10; 348/844; 342/104; 342/175

(58) Field of Classification Search
USPC .............. 340/980, 972, 979, 971; 701/16, 10; 348/E7.091, 844; 342/104, 175
See application file for complete search history.

(56) References Cited

U.S. PATENT DOCUMENTS

| | | | |
|---|---|---|---|
| 5,317,394 A | 5/1994 | Hale et al. | |
| 6,308,044 B1* | 10/2001 | Wright et al. | 455/431 |
| 6,957,130 B1 | 10/2005 | Horvath et al. | |
| 7,292,178 B1* | 11/2007 | Woodell et al. | 342/26 B |
| 7,312,725 B2 | 12/2007 | Berson et al. | |
| 7,352,292 B2 | 4/2008 | Alter et al. | |
| 7,486,291 B2 | 2/2009 | Berson et al. | |
| 7,655,908 B2 | 2/2010 | Kerr | |
| 7,869,943 B1* | 1/2011 | Simon | 701/436 |
| 7,924,172 B1 | 4/2011 | Swearingen et al. | |
| 7,961,117 B1 | 6/2011 | Zimmerman et al. | |
| 7,965,202 B1 | 6/2011 | Chiew et al. | |
| 7,965,223 B1 | 6/2011 | McCusker | |
| 8,010,245 B2 | 8/2011 | Nichols et al. | |
| 8,026,834 B2* | 9/2011 | Larson et al. | 340/980 |
| 2005/0085959 A1* | 4/2005 | Feyereisen | 701/14 |
| 2007/0142980 A1* | 6/2007 | Ausman et al. | 701/3 |
| 2007/0168111 A1* | 7/2007 | Dubourg | 701/120 |
| 2008/0106438 A1* | 5/2008 | Clark et al. | 340/972 |
| 2008/0300735 A1* | 12/2008 | He | 701/3 |
| 2009/0115637 A1* | 5/2009 | Naimer et al. | 340/979 |
| 2009/0265088 A1 | 10/2009 | Dias et al. | |
| 2010/0026525 A1* | 2/2010 | Feyereisen et al. | 340/972 |

(Continued)

FOREIGN PATENT DOCUMENTS

| EP | 2234088 A2 | 9/2010 |
|---|---|---|
| FR | 2884022 A1 | 10/2006 |
| FR | 2888342 A1 | 1/2007 |

OTHER PUBLICATIONS

Kim, S.; Examining and Explaining the Effects of Non-Iconic Conformal Features in Advanced Head-up Displays on Pilot Performance; http://www.openthesis.org/documents/Examining-Explaining-Effects-Non-Iconic; Oct. 14, 2011.

(Continued)

*Primary Examiner* — Benjamin C Lee
*Assistant Examiner* — Chico A Foxx
(74) *Attorney, Agent, or Firm* — Ingrassia Fisher & Lorenz, P.C.

(57) ABSTRACT

A vehicle display system diminishes specified display features when in a taxi mode. EV images, SV images, and avionics symbology are displayed, with certain of the images and symbology being diminished when in a taxi mode. Additionally, guidance to the runway centerline is displayed in the taxi mode.

20 Claims, 4 Drawing Sheets

(56) References Cited

U.S. PATENT DOCUMENTS

| | | |
|---|---|---|
| 2010/0030405 A1 | 2/2010 | He et al. |
| 2010/0113149 A1 | 5/2010 | Suddreth et al. |
| 2010/0161158 A1 | 6/2010 | Gannon et al. |
| 2010/0231418 A1 | 9/2010 | Whitlow et al. |
| 2010/0231705 A1* | 9/2010 | Yahav et al. .......... 348/115 |
| 2010/0268458 A1 | 10/2010 | Becker et al. |
| 2011/0046868 A1 | 2/2011 | Michel et al. |
| 2011/0090096 A1* | 4/2011 | Goh et al. .......... 340/972 |
| 2011/0142281 A1 | 6/2011 | He |

OTHER PUBLICATIONS

George, F.; Flying with Honeywell's Synthetic Vision System; http://www.aviationweek.com/aw/jsp_includes/articlePrint.jsp?headLine=Flying; Oct. 14, 2011.

George, F.; NASA Funds Flight Testing of Honeywell's Enhanced SVS; http://www.aviationweek.com/aw/jsp_includes/articlePrint.jsp?headLine=NASA; Oct. 14, 2011.

EP Search Report for application No. 12 198 224.3 dated Nov. 22, 2013.

* cited by examiner

SYSTEM AND METHOD FOR SELECTING IMAGES TO BE DISPLAYED

TECHNICAL FIELD

The exemplary embodiments described herein generally relate to display systems and more particularly to a display system and method for selecting features to be displayed on an aircraft cockpit display.

BACKGROUND

It is important for pilots to know the layout of the taxiways and runways when taxing for takeoff or from landing. Navigation of an airport surface (taxiways/runways) can be as difficult (from a pilot's workload perspective) and dangerous (from an aviation safety perspective) as the airborne portion of the flight, especially in limited visibility of night and/or weather, or at unfamiliar airports. An increase in pilot workload typically results in decreased safety: the pilot must interpret the information provided on the screen occupying his thought processes when he may have many other decisions to make. Undesired results include taxing onto unapproved taxiways/runways and becoming disorientated while taxing.

Many vehicles, such as aircraft, are commonly equipped with one or more vision enhancing systems to convey flight path and/or flight management information. Such vision enhancing systems are designed and configured to assist a pilot when flying in conditions that diminish the pilot's view from the cockpit, such as, but not limited to, darkness and weather phenomenon. One example of a vision enhancing system is known as a synthetic vision system (hereinafter, "SVS") and may be more generally described as a being a dynamic condition subsystem of the aircraft. An example of a synthetic vision system is disclosed in U.S. Pat. No. 7,352, 292. Additionally, an exemplary synthetic vision system is available for sale in the market place under product name SmartView, manufactured by Honeywell International, Inc.

A typical SVS is configured to work in conjunction with a position determining unit associated with the aircraft as well as with dynamic sensors that sense the aircraft's altitude, heading, and attitude. The SVS typically includes a database containing information relating to the topography along the aircraft's flight path. The SVS receives inputs from the position determining unit indicative of the aircraft's location and also receives inputs from the dynamic sensors on board the aircraft indicative of the aircraft's heading, altitude, and attitude. The SVS is configured to utilize the position, heading, altitude, and orientation information and the topographical information contained in its database, and generate a three-dimensional image that shows the topographical environment through which the aircraft is flying from the perspective of a person sitting in the cockpit of the aircraft. The three-dimensional image may be displayed to the pilot on any suitable display unit accessible to the pilot. Using an SVS, the pilot can look at the display screen to gain an understanding of the three-dimensional topographical environment through which the aircraft is flying and can also see what lies ahead. One advantage of the SVS is that its image is clean and is not obstructed by any weather phenomenon. SV image integrity, however, is limited by the integrity of the information pre-stored in the database. Accordingly, incomplete and/or outdated database information can result in SV images of limited value.

Another example of a vision enhancing system is known as an enhanced vision system (hereinafter, "EVS") and may be more generally described as being a sensor subsystem. Examples of enhanced vision systems are disclosed in U.S. Pat. Nos. 7,655,908 and 5,317,394. Additionally, an exemplary enhanced vision system is available for sale in the market place under product name EVS-II, manufactured by Kollsman, Inc. A typical EVS includes an imaging device, such as, but not limited to, a visible lowlight television camera, an infrared camera, or any other suitable light detection system capable of detecting light or electromagnetic radiation, either within or outside of the visible light spectrum. Such imaging devices are mounted to the aircraft and oriented to detect light transmissions originating from an area outside of the aircraft and are typically located ahead of the aircraft in the aircraft's flight path. The light received by the EVS is used by the EVS to form an image that is then displayed to the pilot on any suitable display in the cockpit of the aircraft. The sensor used in an EVS is more sensitive to light than is the human eye. Accordingly, using the EVS, a pilot can view elements of the topography that are not visible to the human eye. For this reason, an EVS is very helpful to a pilot when attempting to taxi or fly an aircraft in inclement weather or at night. One advantage to an EVS system is that it depicts what is actually present versus depicting what is recorded in a database.

Some display systems display both an SV image and an EV image display. For example, as a fused (merged) image (such as overlaying an EV image onto an SV image) or as a side-by-side display. The images may be indexed at the time of camera installation, e.g., by aligning an EV image sensor to ensure that the sensor and the SV view are indexed. Such a process may be periodically repeated during normal course of maintenance to assure proper alignment. Although such an overlaid "enhanced synthetic vision system" display may be useful, the display can be confusing, noisy, and difficult to interpret. For example, pixel averaging or alpha blending between SV and EV images can result with views being obscured with noisy or non-useful information, making it difficult for the pilot to interpret the information encoded on the display.

In addition to the above described vision systems, additional images, in the form of symbology, are typically presented to the pilot on the same display screen where the images from the EVS and the SVS are displayed. The symbology commonly appears as an icon or a series of icons on the display screen and may be indicative of, for example, the aircraft's heading, direction, attitude, orientation. Such symbology serves an important role in providing the pilot with situational awareness and controls concerning the orientation and attitude of the aircraft. This symbology is traditionally overlaid over the image presented by the SVS and the EVS.

However, the combination of the images from the EV and SV systems and the symbology provide a plethora of information for which the pilot's heads-up time and attention may be unnecessarily demanded.

These integrated symbology and EV and SV images are not necessarily suitable for all phases of flight operation. During the airborne phase, symbology must be prominently displayed for aircraft controls. During taxi operations after landing or prior to take off, pilots must pay more attention to the taxi environment. During low visibility conditions and night operations, the presence of EV images assist the pilot in readily identifying taxiways and objects ahead. However, typical flight symbology may interfere with an understanding of the displayed taxi environment EV images, and additional symbology elements may be needed to assist pilots in low visibility taxi environments.

Accordingly, it is desirable to provide an apparatus and method for improving the display of information necessary for taxi operations. Furthermore, other desirable features and characteristics of exemplary embodiments will become apparent from the subsequent detailed description and the appended claims, taken in conjunction with the accompanying drawings and the foregoing technical field and background.

BRIEF SUMMARY

Display systems and methods for displaying images based on operational status are described. A first exemplary embodiment is an aircraft display system for displaying images to an aircrew of an aircraft, comprising a vision system configured to generate a plurality of features; a ground status system configured to determine whether the aircraft is in a taxi mode or a takeoff mode; a processor coupled to the vision system and the ground status system and configured to diminish at least a first feature when the aircraft is in the taxi mode; enable a symbol in the taxi mode; and disable the symbol in the take off mode; and a display configured to display the symbol and the features including the first diminished feature when in the taxi mode, and the features including the first feature undiminished when in the take off mode.

A second exemplary embodiment is a display system for use in an aircraft while taxiing, comprising an enhanced vision system configured to generate a stream of enhanced vision images, each enhanced vision image comprising a plurality of enhanced features; a synthetic vision system configured to generate a stream of synthetic vision images, each synthetic vision image comprising a plurality of synthetic features; an avionics system configured to generate a plurality of symbols representative of avionics data; a status system for sensing that the aircraft is in one of a taxi mode or a takeoff mode; a processor coupled to the enhanced vision system, the synthetic vision system, the avionics system, and the status system and configured to determine if the aircraft is in the taxi mode or the takeoff mode; and determine which of the enhanced vision features, the synthetic vision features, and the symbology are to be deemphasized in the taxi mode and in the takeoff mode, respectively; and a display configured to display the enhanced vision features, the synthetic vision features, and the symbology for the determined taxi mode or the takeoff mode.

A third exemplary embodiment is a method for displaying features on a display in an aircraft, comprising generating a plurality of images, each image comprising a plurality of features; determining whether the aircraft is in a taxi mode or a takeoff mode; displaying the plurality of features; diminishing at least one of the plurality of features when the aircraft is in the taxi mode.

BRIEF DESCRIPTION OF THE DRAWINGS

The exemplary embodiments will hereinafter be described in conjunction with the following drawing figures, wherein like numerals denote like elements.

DETAILED DESCRIPTION

Figure 1:
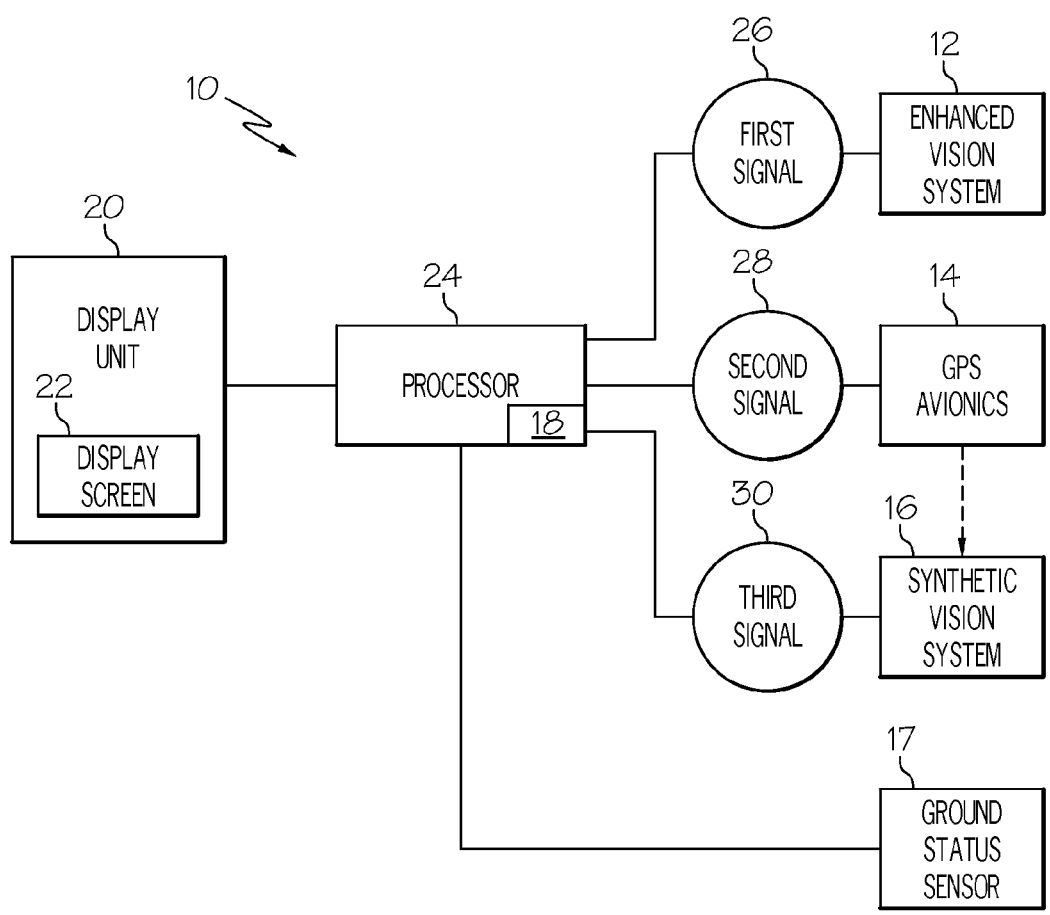
FIG. 1 is a functional block diagram of a flight display system.

The following detailed description is merely exemplary in nature and is not intended to limit the application and uses. Furthermore, there is no intention to be bound by any theory presented in the preceding technical field, background, brief summary, or the following detailed description.

Improved systems and methods for displaying images to a pilot of an aircraft during ground operations are disclosed. Selected EV and SV images and primary flight display symbology are displayed as determined by the operational status, for example, taxiing or ready for takeoff.

When a determination is made that an aircraft is in a taxi mode, for example, low ground speed, not on a runway, or selected by an aircrew member, one or more of the symbology for the airborne mode are faded or removed. Information critical for configuring the aircraft for takeoff, for example, rotation speed, airspeed, flight director modes, and current altitude remain displayed, although less prominently (faded) so images and symbols more important for taxi operations are more readily discerned. Likewise, when a determination is made that the aircraft is positioned for takeoff, the information for configuring the aircraft for takeoff are predominately displayed.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The following detailed description is merely exemplary in nature and is not intended to limit application and uses. Furthermore, there is no intention to be bound by any theory presented in the preceding background or the following detailed description.

Although embodiments described herein are specific to aircraft display systems, it should be recognized that principles of the inventive subject matter may be applied to other vehicle display systems.

FIG. 1 is a simplified functional block diagram illustrating a system 10 for displaying multiple overlaid images to a pilot of an aircraft during flight. System 10 includes multiple components each of which may be configured for mounting to aircraft. In some embodiments, system 10 may be a self-contained system such that each of the components described below are contained in a single housing and are dedicated exclusively to serving the functions of system 10, while in other embodiments, the various components described below may be standalone components or they maybe components that are used as part of other systems and which are configured to be used as a shared resource between such other systems and system 10.

In the embodiment illustrated in FIG. 1, system 10 includes an enhanced vision system 12 (EVS), a Global Positioning System and avionics sensors 14, an ground status decisioner 18, a synthetic vision system 16 (SVS), a ground status sensor 17, a display unit 20, a display screen 22, and a processor 24. In equivalent embodiments, system 10 may include either additional or fewer components.

EVS 12 includes one or more sensors adapted for mounting to an aircraft and configured to detect a light signature originating from outside the aircraft. The sensor may include a visible low light television camera, an infrared camera, and millimeter wave (MMW) camera or any other light sensing device capable of detecting light either within, or outside of the visible spectrum. The light signature may include any light that is projected from, or that is reflected off of any terrain or object outside of the aircraft. In one application, the light signature includes, but is not limited to, signature components from lights that are positioned adjacent to a runway and which are pointed to facilitate approach runway position and bearing identification.

EVS 12 is configured to generate a first signal 26 and to provide first signal 26 to processor 24. First signal 26 is an electronic signal that includes information corresponding to the light signature detected by EVS 12 and which would enable processor 24 to render an image of the light signature (referred to hereinafter as "the EVS image"). For example, if the detected light signature includes components of a distant runway and runway approach lights adjacent to the runway, first signal 26 would enable processor 24 to render an image of the distant runway and the adjacent runway approach lights. In some embodiments, EVS 12 may include a dedicated processor, a microprocessor, circuitry, or some other processing component that is configured to receive input from the one or more light detecting sensors and to generate first signal 26 using such inputs. In other embodiments, EVS 12 may not include a dedicated processor, microprocessor, circuitry or other processing component, in which case the first signal 26 would comprise unprocessed inputs from the light detecting sensors of EVS 12 for processing by processor(s) 24.

SVS 16 is configured to generate a three-dimensional image of the topographical environment around the aircraft (referred to hereinafter as "the SVS image") generate a third signal 30 carrying SVS Image and to provide the third signal 30 to processor 24. In some embodiments, SVS 16 may include a data storage device (not shown) containing a data base with data relating to the topography, which may represent either or both landscape and/or man-made structures located along the aircraft's flight path. In some embodiments, the data storage device may contain such data for an entire geographical region such as a state, a country or continent. SVS 16 may also access or include a position determining unit that is configured to determine the position of the aircraft with respect to the surface of the earth. Such a position determining unit may include, but is not limited to, a GPS system, an inertial navigation system, and the like. SVS 16 may be configured to receive course, speed and other avionics inputs relating to the aircraft's heading, altitude and attitude. In equivalent embodiments, SVS 16 may receive the GPS and avionics inputs from the aircraft's GPS and avionics sensors 14.

In some embodiments, SVS 16 may include a dedicated processor, microprocessor, or other circuitry that is configured to take the information pertaining to the position, attitude, altitude and heading of the aircraft and to utilize the information available in the database to generate a third signal 30 that may be utilized by processor 24 to render a three-dimensional image of the topographical environment through which the aircraft is flying. In other embodiments, SVS 16 may not include a dedicated processor, microprocessor or other circuitry. In such embodiments, third signal 30 would contain the unprocessed sensor information and location data which could then be utilized by processor 24 to render the three dimensional image of the topographical environment. In either event, SVS 16 is configured to provide third signal 30 to processor 24.

The ground status sensor 17 senses whether the aircraft is in a taxi mode or a "ready" for takeoff mode. This sensing of a taxi mode (ground operations) may include, for example, sensing a lower ground speed, weight on wheels, sensing a distance from the runway, or as selected by an aircrew member. The ground status sensor 17 may alternatively be incorporated into the GPS/Avionics system 14.

The display unit 20, as noted above, in response to display commands supplied from the processor 404, selectively renders on the display screen 22 various textual, graphic, and/or iconic information, and thereby supply visual feedback to the operator. It will be appreciated that the display unit 20 may be implemented using any one of numerous known display screens suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display unit 20 may additionally be implemented as a panel mounted display, a HUD (head-up display) projection, or any one of numerous known technologies. It is additionally noted that the display unit 20 may be configured as any one of numerous types of aircraft flight deck displays. For example, it may be configured as a multi-function display, a horizontal situation indicator, or a vertical situation indicator. In the depicted embodiment, however, the display unit 20 is configured as a primary flight display (PFD). In some embodiments, display unit 20 may include multiple display screens 22 and system 10 may include multiple display units 20.

Processor 24 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 24 may comprise a single processor or a plurality of processors acting in concert. In some embodiments, processor 24 may be dedicated for use exclusively with system 10 while in other embodiments processor 24 may be shared with other systems on board the aircraft. In still other embodiments, processor 24 may be integrated into any of the other components of system 10. For example, in some embodiments, processor 24 may be a component of SVS 16 or of EVS 12.

Processor 24 is communicatively coupled to EVS 12, GPS/avionics sensors 14, and SVS 16, and is operatively coupled to display unit 20. Such communicative and operative connections may be effected through the use of any suitable means of transmission, including both wired and wireless connections. For example, each component may be physically connected to processor 24 via a coaxial cable or via any other type of wired connection effective to convey electronic signals. In other embodiments, each component may be communicatively connected to processor 24 across a bus or other similar communication corridor. Examples of suitable wireless connections include, but are not limited to, a Bluetooth connection, a Wi-Fi connection, an infrared connection or the like.

Being communicatively and/or operatively coupled with EVS 12, GPS/avionics sensors 14, SVS 16, and display unit 20, provides processor 24 with a pathway for the receipt and transmission of signals, commands, instructions, and interrogations to and from each of the other components. Processor 24 is configured (i.e., loaded with and being capable of executing suitable computer code, software and/or applications) to interact with and to coordinate with each of the other components of system 10 for the purpose of overlaying images corresponding to first signal 26 and third signal 30. For example, in the illustrated embodiment, processor 24 is configured to receive third signal 30 from SVS 16 and to send a command to display unit 20 instructing display unit 20 to display a corresponding SVS image on a display screen 22. Processor 24 may also be configured o receive a second signal 28 from the aircraft's GPs/Avionics system 14.

Processor 24 is also configured to receive first signal 26 from EVS 12 and to send a command to display unit 20 instructing display unit 20 to display the EVS image on display screen 22. Processor 24 is further configured to command display unit 20 to overlay the semi-transparent EVS image on top of the SVS image. Furthermore, because the EVS image actually presents what is along the aircraft's flight path, processor 24 may give precedence to the EVS image and may, depending on the operational status, command display unit 20 to obscure or gradually fade out portions of the SVS image, the EVS image, and/or the symmbology.

Processor 24 is in operable communication with the ground status decisioner 18. Ground status decisioner 18 may be a suitably configured and programmed computing device or in equivalent embodiments may be a software module executing on the processor 24. In other embodiments, the ground status decisioner 18 may comprise firmware or may be manifested as a combination of hardware, firmware and software. In still other embodiments, the ground status decisioner 18 and the processor 24 may work together in tandem.

Figure 2:
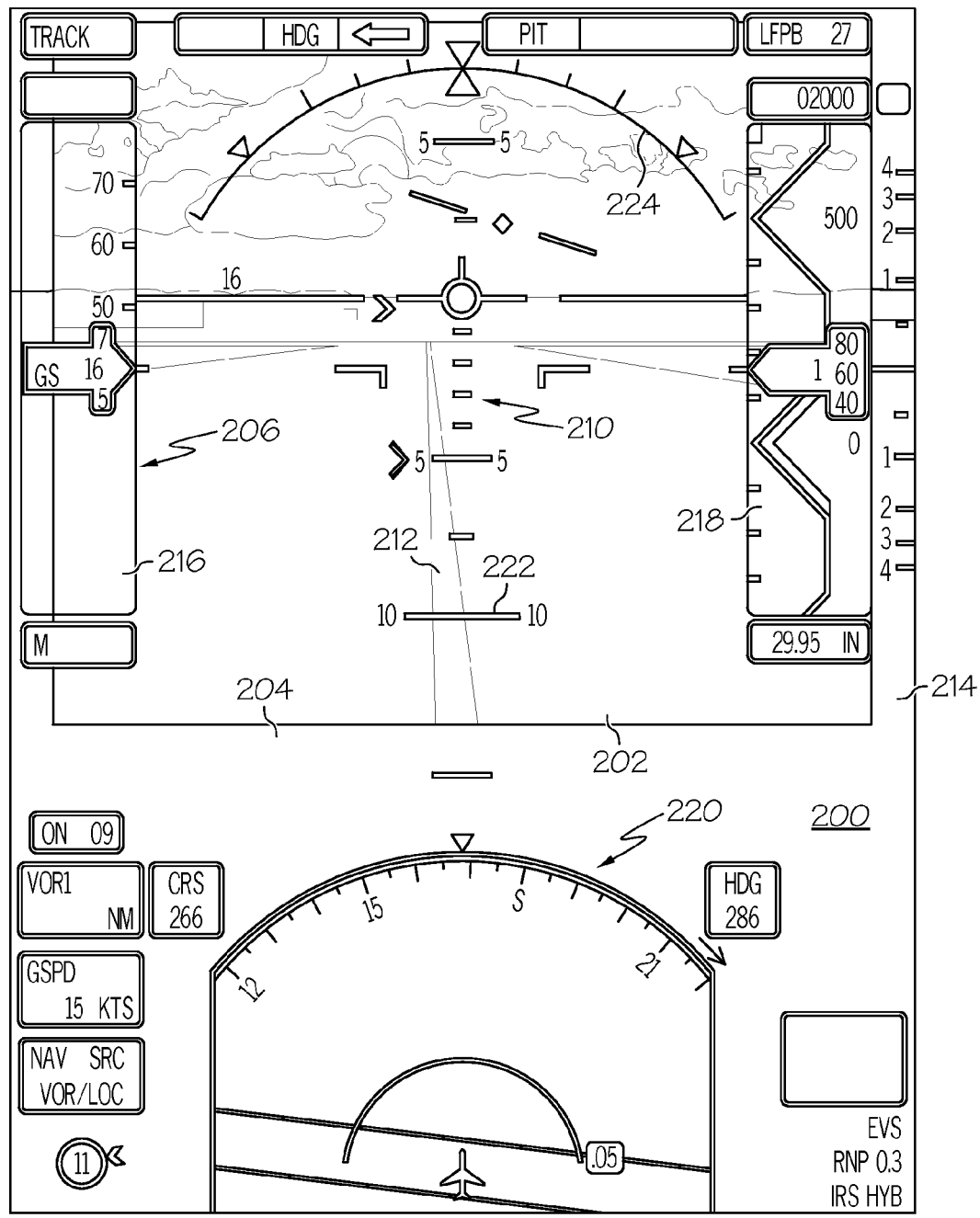
FIG. 2 is a first image displayed in accordance with a first exemplary embodiment that may be rendered on the flight display system of FIG. 1.

Referring to FIG. 2, the display 200 presents a view in front of the aircraft when in a takeoff mode or is determined to be on a runway. Merged EV image 202, SV image 204, and iconic avionics data 206 are displayed. The EV image 202 includes detected features such as a runway center line 212 and the SV image 204 includes features such as the terrain 214 and sometimes synthetically generated runway features such as centerlines and taxiways when database information is available. In the combined display such as in FIG. 2, EV data or sensed data will take precedence of any synthetically generated data, i.e., the EV image portion on the display is opaque for the taxi operation mode. Iconic avionics data 206 includes, for example, an airspeed indicator 216, an altitude indicator 218, compass and heading indicator 220, pitch scale 222, and an attitude indicator 224.

Figure 3:
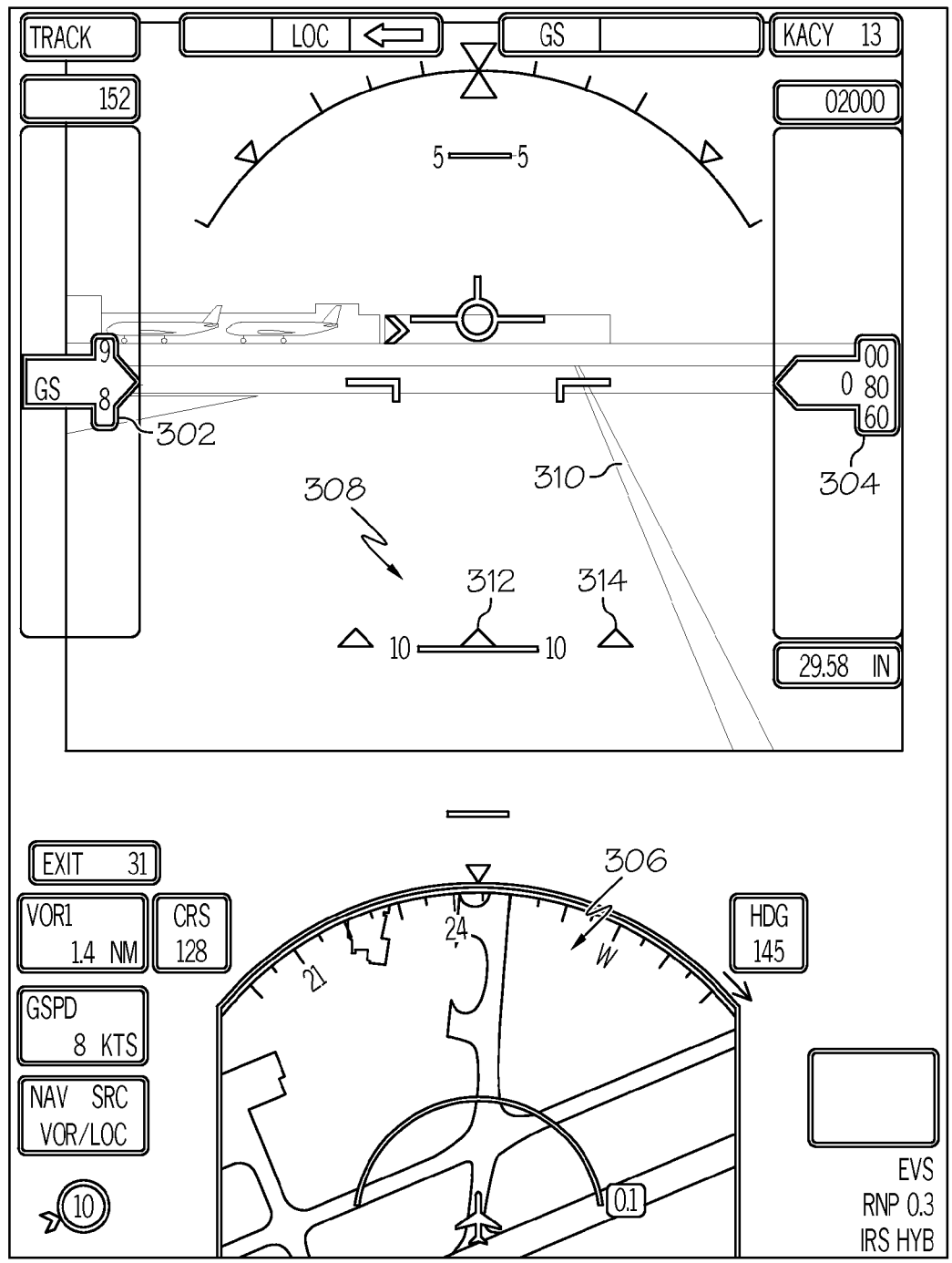
FIG. 3 is a second image displayed in accordance with the first exemplary embodiment that may be rendered on the flight display system of FIG. 1.

FIG. 3 is a view as presented in the taxi mode in accordance with one exemplary embodiment. While some features or part of the features, such as iconic avionics data 206 including the trend information of airspeed indicator 216, the trend information of altitude indicator 218, and most of the pitch ladder within center of the display 210 have been removed except for the digital display of ground speed 302 and altitude 304 (which may be displayed less predominately) and some part of the pitch ladder not interfering with taxi environment displays. Display information added when in the taxi mode include triangles 308 for indicating if the current aircraft position is centered on the taxiway guidance centerline 310 and optionally a taxiway diagram 306 on the primary flight display. The triangles 308 as shown indicate the aircraft is to the left of the taxiway centerline detected by the EVS camera and is beyond a pre-determined acceptable distance. Such a distance limit is aircraft dependent so as to provide pilots an indication that aircraft main gears will stay within the taxiway boundaries. If the aircraft was on the centerline 310, the center triangle 312 would be on the centerline 310. If the aircraft was left of the centerline 310, but within an acceptable distance, while the center triangle 312 would be left of the centerline 310, the right triangle 314 would be on or right of the centerline 310. The separation of the triangles on the display can be determined by projecting the real world maximum limit allowed to deviate from the taxiway centerline to the display via typical perspective view transformation for a given aircraft height above ground and with the symbology displayed at, for example, 10 degree down looking pitch ladder position.

Figure 4:
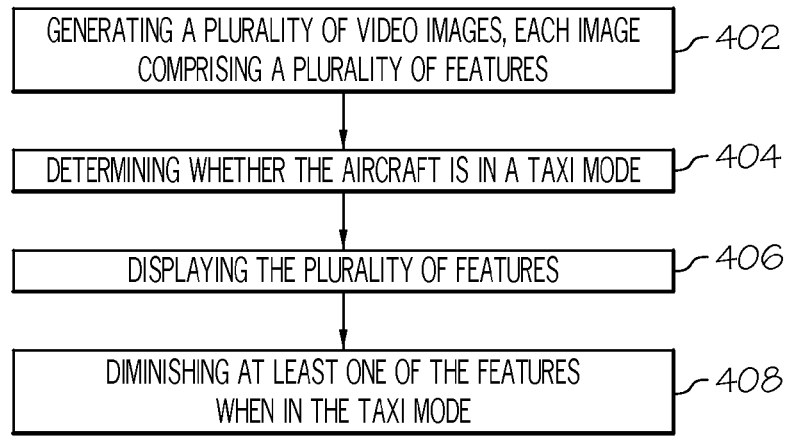
FIG. 4 is a flow diagram of a method for generating a merged image of an SV image and a filtered EV image, in accordance with the first exemplary embodiment.
Figure 5:
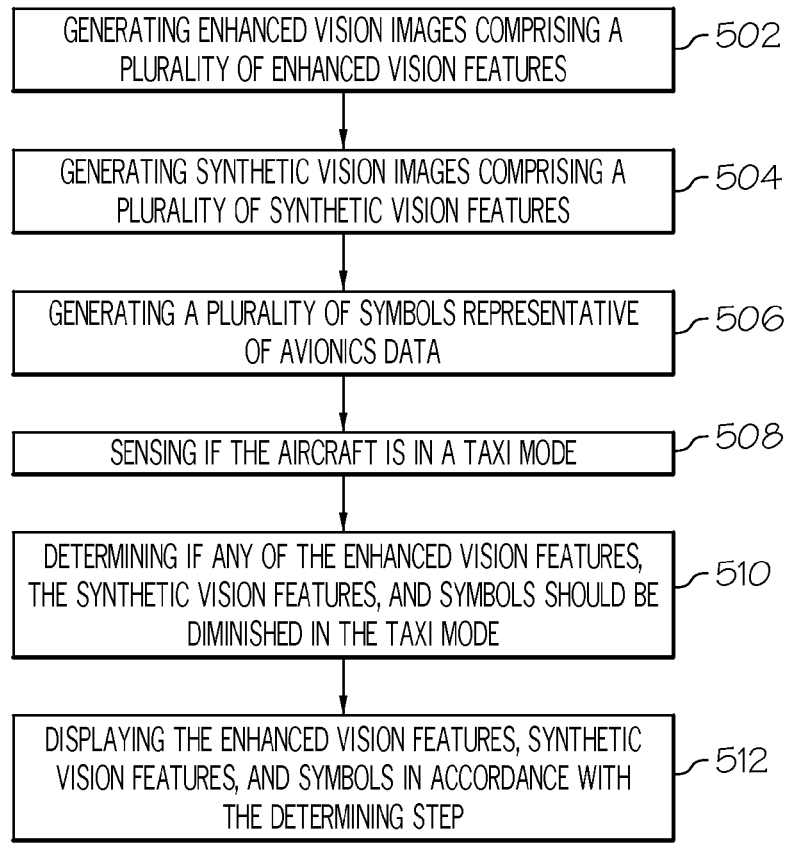
FIG. 5 is a flow diagram of a method for generating a merged image of an SV image and a filtered EV image, in accordance with a second exemplary embodiment.

FIGS. 4 and 5 are flow charts that illustrate an exemplary embodiment of a display process 400, 500 suitable for use with a flight deck display system such as the display system 10. Processes 400, 500 represents implementations of a method for displaying aircraft traffic information on an onboard display element of a host aircraft. The various tasks performed in connection with processes 400, 500 may be performed by software, hardware, firmware, or any combination thereof For illustrative purposes, the following description of processes 400, 500 may refer to elements mentioned above in connection with FIGS. 4, 5. In practice, portions of processes 400, 500 may be performed by different elements of the described system, e.g., a processor, a display element, or a data communication component. It should be appreciated that processes 400, 500 may include any number of additional or alternative tasks, the tasks shown in FIGS. 4, 5 need not be performed in the illustrated order, and processes 400, 500 may be incorporated into a more comprehensive procedure or process having additional functionality not described in detail herein. Moreover, one or more of the tasks shown in FIGS. 4, 5 could be omitted from an embodiment of the processes 400, 500 as long as the intended overall functionality remains intact.

FIG. 4 is a flow diagram of a first exemplary method of operating the vehicle display system 10 in accordance with an exemplary embodiment. In an exemplary embodiment, a vision system 12, 14, 16 generates 402 video images, each comprising a plurality of features, step 402. A determination is made 404 whether the aircraft is in a taxi mode. The plurality of features is displayed 406, and at least one of the features is diminished 408 when in the taxi mode.

FIG. 5 is a flow diagram of a second exemplary method of operating the vehicle display system 10 in accordance with an exemplary embodiment. In an exemplary embodiment, an EV vision system 12 generates 502 EV video images, each comprising a plurality of features in response to data supplied by the enhanced image sensor. The generation of EV images 204 comprises, for example, the generation of infrared images or millimeter-wave images. In the same timeframe, an SV database containing information regarding terrain and objects for a taxi path of the vehicle are accessed and SV images, each comprising a plurality of SV features, are generated 504. Travel conditions symbology provided by the GPS/Avionics system 14, including information such as aircraft position, heading, present altitude, speed, are generated 506. The ground status sensor 17 senses 508 if the aircraft is in a taxi mode. If so, selected features are diminished 510 before displaying the EV features, SV features, and symbology.

In another exemplary embodiment, the SV and EV images are displayed in different formats, enabling the operator viewing the displayed images to distinguish between the two images. The two formats may be represented, for example, by different colors. In other embodiments, the different formats may include, for example, different brightness.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims.

What is claimed is:

1. An aircraft display system for displaying images to an aircrew of an aircraft, comprising:
   a vision system configured to generate a plurality of informational features;
   a ground status system configured to determine whether the aircraft is in a taxi mode or a takeoff mode;
   a processor coupled to the vision system and the ground status system and configured to automatically:
      diminish a first informational feature when the aircraft is in the taxi mode, the first informational feature being selected from one of the group consisting of rotation speed, airspeed, flight director modes, and altitude;
      disable a second informational feature comprising attitude display elements, in the taxi mode;
      enable a first symbol in the taxi mode, the first symbol indicating a proximity of the aircraft with respect to the taxiway centerline; and
      disable the first symbol in the takeoff mode; and
   a display configured to display the first symbol and the informational features including the first diminished informational feature when in the taxi mode, and the informational features including the first informational feature undiminished when in the takeoff mode.

2. The aircraft display system of claim 1 wherein the ground status system is configured to:
   detect weight on the wheels and speed the aircraft is traveling.

3. The aircraft display system of claim 1 wherein the ground status system is configured to:
   determine the proximity of the aircraft to a runway.

4. The aircraft display system of claim 1 wherein the ground status system is configured to:
   sense a selection by the aircrew.

5. The aircraft display system of claim 1 wherein the processor is further configured to:
   provide a second symbol in the taxi mode indicating the taxiway centerline is proximate to a line along a direction aligned with the aircraft centerline.

6. The aircraft display system of claim 1 wherein the processor is further configured to:
   provide a second symbol in the taxi mode indicating a runway or the taxiway centerline, and a distance between the first and second symbols represents a distance on the ground.

7. The aircraft display system of claim 1 wherein the processor is further configured to:
provide the first symbol and a second symbol in the taxi mode wherein a distance between the first and second symbols is determined by a size of the aircraft and width of the taxiway or the runway.

8. The aircraft display system of claim 6 wherein the processor is further configured to:
provide a distance between the first and second symbols as determined by the aircrew.

9. A display system for use in an aircraft while taxiing, comprising:
an enhanced vision system configured to generate a stream of enhanced vision images, each enhanced vision image comprising a plurality of enhanced informational features;
a synthetic vision system configured to generate a stream of synthetic vision images, each synthetic vision image comprising a plurality of synthetic informational features;
an avionics system configured to generate a plurality of symbols representative of avionics data;
a status system for sensing that the aircraft is in one of a taxi mode and a takeoff mode;
a processor coupled to the enhanced vision system, the synthetic vision system, the avionics system, and the status system and configured to automatically:
determine if the aircraft is in the taxi mode or the takeoff mode; and determine which of the enhanced vision informational features, the synthetic vision informational features, and the symbology are to be deemphasized and disabled in the taxi mode and in the takeoff mode, respectively;
enable a first symbol in the taxi mode indicating a proximity of the aircraft with respect to a taxiway centerline; and
a display configured to display the first symbol, and selectively the enhanced vision informational features, the synthetic vision informational features, and the symbology according to the determined taxi mode or the takeoff mode, respectively.

10. The display system of claim 9 wherein the processor is further configured to:
provide a second symbol in the taxi mode indicating the proximity to a line along a direction aligned with the aircraft centerline.

11. The display system of claim 9 wherein the processor is further configured to:
provide a second symbol in the taxi mode indicating a proximity of the aircraft to the runway centerline, and a distance between adjacent first and second symbols represents a distance on the ground.

12. The display system of claim 9 wherein the processor is further configured to:
provide a second symbol in the taxi mode indicating a proximity of the aircraft to the runway centerline, wherein a distance between adjacent first and second symbols is determined by the aircrew.

13. A method for displaying informational features on a display in an aircraft, comprising:
generating a plurality of images, each image comprising a plurality of features;
determining whether the aircraft is in a taxi mode or a takeoff mode;
displaying the plurality of informational features;
automatically diminishing at least one of the plurality of informational features when the aircraft is in the taxi mode;
automatically disabling at least one of the other informational features when in the taxi mode; and
automatically enabling a first symbol in the taxi mode, the symbol indicating a proximity of the aircraft with respect to a taxiway centerline.

14. The method of claim 13 wherein the determining step comprises:
detect weight on the wheels and speed the aircraft is traveling.

15. The method of claim 13 wherein the determining step comprises:
determine the proximity of the aircraft to a runway.

16. The method of claim 13 wherein the determining step comprises:
sense a selection of a desired distance for the proximity by the aircrew.

17. The method of claim 13 further comprising:
providing a second symbol in the taxi mode indicating the plurality of images are proximate to a line along a direction aligned with the aircraft centerline.

18. The method of claim 13 further comprising:
providing a second symbol in the taxi mode indicating a proximity of the aircraft to the runway centerline, and a distance between the first and second symbols represents a distance on the ground.

19. The method of claim 13 further comprising:
providing a second symbol in the taxi mode indicating a proximity of the aircraft to the runway centerline, and a distance between the first and second symbols is determined by a size of the aircraft.

20. The method of claim 13 further comprising:
providing in the taxi mode indicating a proximity of the aircraft to the runway centerline, wherein a distance between the first and second symbols is determined by the aircrew.

* * * * *